United States Patent [19]
Ellis et al.

[11] 3,868,750
[45] Mar. 4, 1975

[54] METHOD OF JOINING DIAMOND TO METAL

[75] Inventors: George S. Ellis, Newark; Thomas E. Kimble, New Castle; James R. Sawers, Wilmington, all of Del.

[73] Assignee: E. I. du Pont de Nemours and Company, Wilmington, Del.

[22] Filed: Mar. 21, 1974

[21] Appl. No.: 453,342

[52] U.S. Cl. ........... 29/95 R, 76/101 R, 76/DIG. 12, 29/473.1, 125/39
[51] Int. Cl. ............................................. B26d 1/00
[58] Field of Search ................... 76/101 R, DIG. 12; 29/473.1, 95 R; 75/165; 125/39

[56] References Cited
UNITED STATES PATENTS

| | | | |
|---|---|---|---|
| 3,025,726 | 3/1962 | Miller | 76/101 R |
| 3,192,620 | 7/1965 | Huizing et al. | 29/473.1 |
| 3,216,730 | 11/1965 | Ogura et al. | 125/39 X |
| 3,678,568 | 7/1972 | Knippenberg | 29/473.1 |

*Primary Examiner*—Leonidas Vlachos

[57] ABSTRACT

Disclosed herein is a method for joining a diamond to a metal shank by means of a two stage process in which the diamond is first adhered to a metal blank, using a gold-tantalum or gold-niobium alloy, and then the composite structure is adhered to the metal shank using a different bonding material.

18 Claims, 4 Drawing Figures

3,868,750

METHOD OF JOINING DIAMOND TO METAL

BACKGROUND OF THE INVENTION

1. Field of the Invention

This invention relates to a process for joining a diamond to a metal shank and to an article of manufacture produced by such a process. The article of manufacture is useful as a tool, such as a machine tool or a microtome blade.

2. Discussion of the Prior Art

It is well known that metals do not generally provide satisfactory junctions to diamonds. This is primarily due to the fact that, in the fluid stated, most metals do not wet diamonds, or they wet them inadequately so that an adhesive joint is difficult to form. There are exceptions to this. In particular, a satisfactory method of joining diamonds to metal is described in U.S. Pat. No. 3,192,620 which issued to Huizing et al on July 6, 1965. Huizing et al discovered that a very satisfactory adhesive junction between a diamond and a metal can be obtained by using, as a solder, an alloy of gold containing at least one percent by weight of tantalum and/or niobium.

For many purposes, however, the knowledge that a strong bond between a metal and a diamond can be formed using this particular alloy is not enough to allow one to make a useful article of manufacture in a commercially feasible fashion. For example, the temperature at which the alloy melts is high; near or above the graphitization temperature of diamond, depending on the alloy composition. This fact gives rise to two complications. First, to avoid graphitizing the diamond, the alloy must be heated very rapidly to its melt temperature and then cooled very rapidly. Induction heating is the common, and, in fact, the preferred way of achieving rapid heating. It has been observed, however, that during the heating step, particularly heating by induction, the diamond may move unless it is held in place. Even with clamping, some rotation of the diamond may occur. This means that if one wishes to orient a particular surface of the diamond relative to a particular surface of the metal shank, some means must be provided to either prevent movement of the diamond, or to neutralize the effect of movement of the diamond.

The second complication introduced by the fact that the alloy melts at such a high temperature is the fact that the metal joined to the diamond must be one that is compatible with high temperatures. Such metals are generally quite hard and, consequently, difficult to machine or grind. Therefore, the time required to produce diamond cutting tools, and hence their expense, is increased.

The present invention provides a process for producing an article of manufacture in which the diamond is securely bonded to a metal shank which is made from an easily worked material, and in which the diamond is easily oriented in the desired direction.

SUMMARY OF THE INVENTION

The present invention is directed to a process for joining a diamond to a metal shank by a two stage process comprising the steps of:

a. joining the diamond to at least one metal blank by applying an alloy selected from the group consisting of gold-tantalum alloys containing from about 1 to about 25% by weight of tantalum, and gold-niobium alloys containing from about 1 to about 10% by weight of niobium to opposed surfaces of the diamond and the metal blanks and melting the alloy in an inert atmosphere; and b. joining the composite structure so formed to the metal shank by applying a bonding medium to opposing surfaces of the metal blanks and said metal shank and curing the bonding medium.

The two step processes allows one to utilize the desirable characteristics of different materials. For example, the blanks can be made from a material, such as molybdenum, having the high temperature characteristic necessitated by the high melting temperature of the alloy, and yet the shank can be made from a material, such as Monel, which is easily machined.

In the preferred process, therefore, the blanks and the shank are made from different metals. Furthermore, the bonding medium used to join the composite structure to the shank is a metal solder, such as silver solder. In a still more preferred process, two metal blanks are used, each adhered to opposite surfaces of the diamond.

If the process is to be used to make a diamond cutting tool, it is preferred if the bonding medium is applied in sufficient quantity to substantially encapsulate the diamond, and the process further comprises the step of machining the metal shank and the diamond to form an exposed cutting surface on the diamond.

The process described above produces an article of manufacture comprising a diamond, an alloy selected from the group consisting of gold-tantalum alloys containing from 1 to about 25% by weight of tantalum, and gold-niobium alloys containing from about 1 to about 10% by weight of niobium; at least one metal blank adhered to the diamond by the alloy; a bonding medium; and a metal shank adhered to the metal blank by the bonding medium.

Again, in the preferred embodiment, two metal blanks are adhered to opposite surfaces of a diamond chip, the metal shank and the metal blanks are made from different materials and the bonding medium is a metal solder, such as silver solder.

If the article of manufacture is a diamond cutting tool, at least a portion of the diamond is exposed to form a cutting edge.

BRIEF DESCRIPTION OF THE DRAWINGS

The present invention can best be described by reference to the following drawings in which.

DESCRIPTION OF THE PREFERRED EMBODIMENT

Figure 1:
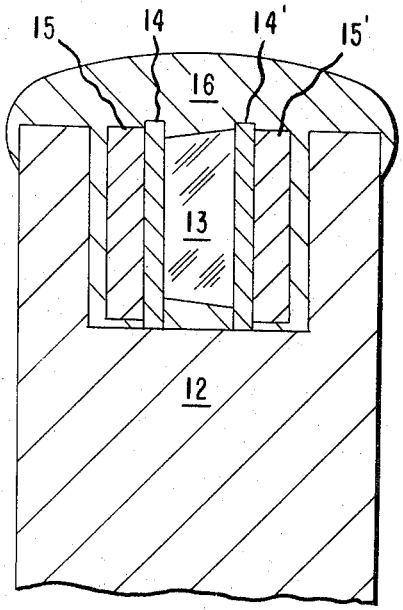
FIG. 1 is a cross-sectional view of a structure formed by bonding a diamond to a metal shank by the process of the present invention.

In the first step of the process, a diamond chip is prepared by thoroughly cleaning it and degreasing it, using methods well known to those skilled in the art. This diamond is then joined to at least one metal blank by applying an alloy material between the opposed surfaces of the metal blank and the diamond, and melting the alloy in an inert atmosphere.

As used in this specification, the term "metal blank" refers to any conveniently shaped substrate, such as a thin button, made from any suitable metal. Because of the high temperatures involved, metals such as molybdenum, chromium, irridium, tantalum, niobium and titanium are preferred. Molybdenum has a coefficient of thermal expansion that is reasonably close to that of diamond, and for that reason is to be preferred for normal applications. However, diamonds seem to acquire a resistance to flaw fracture if they are pre-stressed, so, in certain applications, it may be advantageous to prestress the diamond by using metal blanks made from a material such as titanium with a considerably higher coefficient of thermal expansion than diamond. When the composite structure formed by joining the diamond to the metal blanks cools, the diamond will be compressed by the tendency of the blanks to contract more than the diamond.

The diamond can be any diamond having a surface which will mate with the metal blank. A triangular slab of diamond with its cleavage plane located parallel to the surface of the blank is suitable. If the ultimate product is to be a diamond cutting tool, the diamond is oriented so that its cutting edge or point is formed from a portion of the diamond which is relatively hard crystallographically. The diamond, however, can be oriented in any desired direction.

The alloy used is any of the gold-tantalum alloys containing from about 1 to about 25% by weight of tantalum or gold-niobium alloys containing from about 1 to about 10% by weight of niobium disclosed in U.S. Pat. No. 3,192,620 referred to above.

In the first step of the process, care must be taken to insure that an effective bond between the diamond and the metal blank is achieved, but no particular care need by taken to insure that the diamond's orientation does not change because the diamond can be properly oriented during the second step.

The composite structure formed in the above step is placed in contact with the metal shank. The shank can be made from any suitable metal, but in the preferred embodiment, the shank is made from a metal such as aluminum metal, stainless steel or "Monel" which can be easily machined. As used in this specification, the term machined shall mean any mechanical process designed to change the geometry of the original article, such as cutting, grinding, lapping or polishing.

The diamond is oriented as desired and the composite structure is joined to the metal shank by applying a bonding medium to the opposing surface of the metal blank and the composite structure, and curing the bonding medium.

The bonding medium can be any bonding medium capable of producing a strong bond between the metal shank and the metal blanks. Organic bonding media, such as epoxies, may be used, but in the preferred embodiment, the bonding medium is a metal solder, with a strong, low temperature metal solder, such as silver solder, being especially preferred. The term curing, as it applies to the bonding medium, is meant to include any means for effectuating a bond between the shank and the blanks, including melting the metal solder.

The first step of adhering the diamond to the metal blank required a high temperature because of the melting properties of the gold alloy. The second bonding step can be accomplished at a much lower temperature. Therefore rapid heating is not necessary, and conventional soldering techniques can be used without fear that the diamond will either graphitize or move.

In FIG. 1, a metal shank 12 having a slot formed in one of its surfaces is shown. In the embodiment illustrated, the metal shank is made from "Monel". A composite structure formed from a diamond adhered to two metal blanksk, 15 and 15' (preferably of molybdenum), by the gold-tantalum or gold-niobium alloy material, 14 and 14', is located in the slot.

Figure 2:
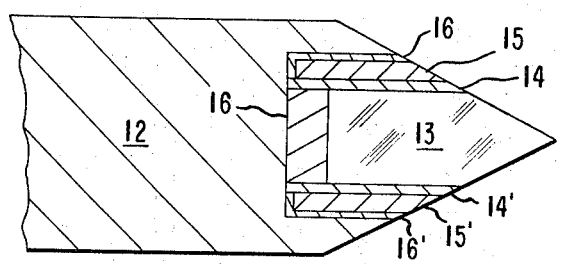
FIG. 2 is a cross-sectional side view of a diamond cutting tool formed by grinding the structure shown in FIG. 1 to form an exposed cutting surface on the diamond.

The composite structure formed from the diamond and the blank is positioned so that the diamond is oriented in the proper direction, and is joined to the metal shank by a metal solder button 16, which encapsulates the composite structure (particularly the diamond). Although such encapsulation is not necessary, it does help stabilize the diamond during any machining step. In FIG. 2, a diamond cutting tool has been formed by machining the article of manufacture shown in FIG. 1 to expose a sharp cutting edge on the diamond. This is usually accomplished by lapping and polishing.

Figure 3:
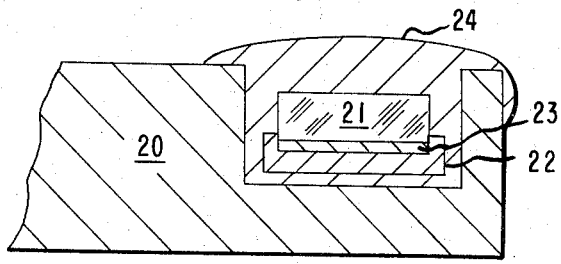
FIG. 3 is a cross-sectional view of another structure formed by bonding a diamond to a metal shank by the process of the present invention.

FIG. 3 illustrates a second embodiment of an article of manufacture of the present invention, in which the diamond 21 is adhered to a single molybdenum button 22 by a gold-tantalum or gold-niobium alloy 23. The button has been formed into the shape of a pan designed to hold the diamond. The composite structure is then placed in a blind hole formed in metal shank 20, and adhered in place by a button of metal solder 24.

Figure 4:
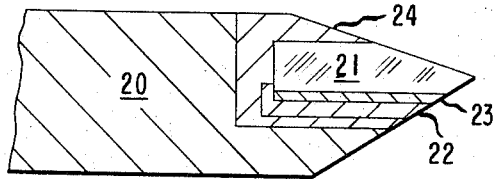
FIG. 4 is a cross-sectional view of a diamond cutting tool formed by grinding the structure shown in FIG. 3 to form an exposed cutting surface on the diamond.

In FIG. 4, a cutting tool has been made from the structure shown in FIG. 3 by lapping and polishing the structure to expose a portion of the diamond in the form of a cutting edge.

EXAMPLE

A diamond cutting tool was made by bonding two pieces of molybdenum foil (0.25 inch by 0.25 inch by 0.01 inch) to both the top and bottom surfaces of a triangular diamond slab. This was done by placing gold-tantalum (95–5) alloy foil between the diamond and each piece of molybdenum. With this layered combination held together by carbon fixtures, which also served as susceptors in an induction furnace, the composite structure was heated in a vacuum to a temperature high enough to permit the alloy to bond the molybdenum to the diamond (approximately 1,600°C.).

The second bonding step, utilizing silver solder, was also accomplished by induction heating, this time in a hydrogen atmosphere. In this step, the previously formed composite was joined to a "Monel" shank (1.0 inch by 0.3 inch by 0.1 inch). The composite structure was properly positioned crystallographically, in the "Monel" shank and held in place by carbon fixtures. It was then covered with powdered silver solder and heated to approximately 650°C. to permit the silver solder to flow around the molybdenum-diamond composite, encapsulating it and bonding it to the "Monel" shank. Thorough encapsulation prevents leakage when the tool is used as a microtome knife.

A standard lapping and polishing procedure was used to form an exposed cutting edge on the diamond. The lapping procedure used was the same as that used for diamonds joined directly to a molybdenum shank by the alloys. However, due to the softer material used for the shank, machining time was reduced to 25% of that required for solid molybdenum shank (12 hours versus 3 hours).

What is claimed is:

1. A process for joining a diamond to a metal shank comprising, in sequence, the steps of:
   a. joining said diamond to at least one metal blank by applying an alloy selected from the group consisting of gold-tantalum alloys containing from about 1 to about 25% by weight of tantalum and gold-niobium alloys containing from about 1 to about 10% by weight of niobium, to opposing surfaces of said diamond and said metal blanks, and melting said alloy in an inert atmosphere; and
   b. joining the composite structure so formed to said metal shank by applying a bonding medium to opposing surfaces of said metal blank and said metal shank and curing said bonding medium.

2. The process of claim 1 wherein said bonding medium is applied in sufficient quantity to substantially encapsulate said diamond.

3. The process of claim 1 wherein the step of joining said diamond to at least one metal blank comprises joining said diamond to two metal blanks to opposite surfaces of a diamond chip.

4. The process of claim 1 wherein said bonding medium is a metel solder and curing said bonding medium is accomplished by melting said metal solder.

5. The process of claim 4 wherein said metal blanks and said metal shank are made from different materials and wherein the step of joining the composite structure to said metal shank comprises applying a silver solder to the opposed surfaces of said metal blank and said metal shank and melting said silver solder.

6. The process of claim 1 wherein said diamond is pre-stressed by joining said diamond to at least one metal blank made from a material with a higher coefficient of thermal expansion than diamond so that the diamond is compressed when the composite structure cools.

7. A process for making a diamond cutting tool comprising the steps of:
   a. joining said diamond to at least one metal blank by applying an alloy selected from the group consisting of gold-tantalum alloys containing from about 1 to about 25% by weight of tantalum and gold-niobium alloys containing from about 1 to about 10% by weight of niobium to opposing surfaces of said diamond and said metal blanks and melting said alloy in an inert atmosphere;
   b. joining the composite structure so formed to said metal shank by applying a bonding medium to opposing surfaces of said metal blank and said metal shank and curing said bonding medium; and
   c. machining said metal shank and said diamond to form an exposed cutting surface on said diamond.

8. The process of claim 7 wherein said bonding medium is applied in sufficient quantity to substantially encapsulate said diamond.

9. The process of claim 7 wherein the step of joining said diamond to at least one metal blank comprises joining said diamond to two metal blanks to opposite surfaces of a diamond chip.

10. The process of claim 7 wherein said bonding medium is a metal solder and curing said bonding medium is accomplished by melting said metal solder.

11. The process of claim 10 wherein said metal blanks and said metal shank are made from different materials and wherein the step of joining the composite structure to said metal shank comprises applying a silver solder to the opposed surfaces of said metal blank and said metal shank and melting said silver solder.

12. The process of claim 7 wherein said diamond is pre-stressed by joining said diamond to at least one metal blank made from a material with a higher coefficient of thermal expansion than diamond so that the diamond is compressed when the composite structure cools.

13. An article of manufacture comprising a diamond, an alloy selected from the group consisting of gold-tantalum alloys containing from about 1 to about 25% by weight of tantalum, and gold-niobium alloys containing from about 1 to about 10% by weight of niobium; at least one metal blank adhered to said diamond by said alloy; a bonding medium; and a metal shank adhered to said metal blank by said bonding medium.

14. The article of claim 13 wherein said bonding medium is a metal solder.

15. The article of claim 13 wherein said metal shank and said metal blank are made from different materials and said bonding medium is silver solder.

16. The article of claim 15 wherein said metal blanks are made from molybdenum.

17. The article of claim 13 comprising two metal blanks adhered to opposite surfaces of a diamond chip.

18. The article of claim 13 wherein at least a portion of said diamond is exposed to form a cutting edge.

* * * * *